United States Patent
Klinger et al.

(10) Patent No.: US 11,105,649 B2
(45) Date of Patent: Aug. 31, 2021

(54) PROVIDING NAVIGATIONAL ASSISTANCE TO TARGET LOCATION IN VEHICLE PARKING FACILITY

(71) Applicant: International Business Machines Corporation, Armonk, NY (US)

(72) Inventors: Doina L. Klinger, Winchester (GB); David J. Nice, Southampton (GB); Rebecca M. Quaggin-Mitchell, Botley (GB); Fenglian Xu, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 16/021,115

(22) Filed: Jun. 28, 2018

(65) Prior Publication Data

US 2020/0003578 A1 Jan. 2, 2020

(51) Int. Cl.
*G01C 21/36* (2006.01)
*H04W 4/024* (2018.01)
(Continued)

(52) U.S. Cl.
CPC ......... *G01C 21/3661* (2013.01); *G01C 21/20* (2013.01); *H04L 67/18* (2013.01); *H04W 4/024* (2018.02); *H04W 4/026* (2013.01)

(58) Field of Classification Search
CPC .............. G01C 21/3661; G01C 21/20; G01C 21/3679; G01C 21/3685; H04W 4/024; H04W 4/026; H04L 67/18; G08G 1/005
See application file for complete search history.

(56) References Cited

U.S. PATENT DOCUMENTS

| 9,080,878 B2 | 7/2015 | Skinder et al. |
| 9,852,629 B2 | 12/2017 | Engelen et al. |

(Continued)

FOREIGN PATENT DOCUMENTS

| CN | 103714716 B | 1/2016 |
| CN | 106153047 A | 11/2016 |

(Continued)

OTHER PUBLICATIONS

Patent Cooperation Treaty, PCT, Notification of Transmittal of the International Search Report and The Written Opinion of the International Searching Authority, or the Declaration, International Application No. PCT/IB2019/055330, International Filing Date: Jun. 25, 2019, 9 pages.

(Continued)

*Primary Examiner* — Adam R Mott
(74) *Attorney, Agent, or Firm* — Stephanie L. Carusillo

(57) ABSTRACT

In an approach for providing navigational assistance to a target location in a vehicle parking facility, a processor accesses stored vehicle registration numbers each mapped to a location of a vehicle in a parking facility in a database. A processor associates a user with a target vehicle registration number. A processor receives input of a reference vehicle registration number from a mobile user device at a current location of the user using an input component of the mobile user device and references the database of vehicle registration numbers. A processor identifies a current location in the parking facility by look up of the reference registration number; identifies a user's target location in the parking facility by look up of the target registration number associated with the user; and generates dynamic navigational instructions from the current location to the user's target location for sending to the mobile user device.

14 Claims, 9 Drawing Sheets

(51) Int. Cl.
*G01C 21/20* (2006.01)
*H04W 4/02* (2018.01)
*H04L 29/08* (2006.01)

(56) References Cited

U.S. PATENT DOCUMENTS

| | | |
|---|---|---|
| 2009/0315738 A1 | 12/2009 | Falk et al. |
| 2014/0256258 A1 | 9/2014 | DeLuca |
| 2017/0234964 A1 | 8/2017 | Chua et al. |
| 2018/0120443 A1* | 5/2018 | Kandasamy .......... G01S 19/235 |
| 2019/0316927 A1* | 10/2019 | Pu ...................... G01C 21/3623 |

FOREIGN PATENT DOCUMENTS

| | | | | |
|---|---|---|---|---|
| CN | 106297368 A | 1/2017 | | |
| CN | 106384527 A | 2/2017 | | |
| WO | WO-2018000823 A1 * | 1/2018 | ......... | G01C 21/3623 |
| WO | 2018018630 A1 | 2/2018 | | |

OTHER PUBLICATIONS

Quaggin-Mitchell et al., Management of Parking Spaces, U.S. Appl. No. 15/709,529, filed Sep. 20, 2017, 32 pages.

Quaggin-Mitchell et al., Management of Parking Spaces, U.S. Appl. No. 15/813,205, filed Nov. 15, 2017, 32 pages.

Aalsalem et al., "CampusSense—A smart vehicle parking monitoring and management system using ANPR cameras and android phones", 3 pages, Date of Conference: Feb. 19-22, 2017, Publisher: IEEE.

"An Innovative and Practical Method and Solution for Retrieving Parking Spot", ip.com Disclosure No. IPCOM0001212147D; Publication Date: Nov. 2, 2011, 6 pages.

Muthoilib, et al., "Development of Portable Automatic Number Plate Recognition System on Android Mobil Phone", Published under licence by IOP Publishing Ltd; IOP Conference Series: Materials Science and Engineering, vol. 53, conference 1, 3 pages.

"Siemens' Car Finder—a first for Heathrow's Terminal 5", 2 pages.

* cited by examiner

PROVIDING NAVIGATIONAL ASSISTANCE TO TARGET LOCATION IN VEHICLE PARKING FACILITY

BACKGROUND

The present invention relates to providing navigational assistance to a user, and more specifically, to providing navigational assistance to a target location in a vehicle parking facility.

Automatic number-plate recognition (ANPR) is a well-established technology that identifies a car number plate, extracting the characters from a photograph or a still of a video image. ANPR is sometimes known by other names such as automatic license-plate recognition (ALPR), automatic vehicle identification (AVI), car-plate recognition (CPR), etc.

When a person returns to his/her car in a car park after a long absence, the person may not remember where the car is parked, especially in very large car parks. Car parks do not tend to have many distinguishing landmarks and, even if a user has a rough idea of the location in the car park, it is easy to get confused in a large car park. With some large car parks, a person may enter one specific car park that then flows into another car park, which can cause even further confusion.

Existing technologies using Global Positioning Systems (GPS) often do not work accurately in multi-story car parks because of a lack of GPS reception. Also, many current mapping applications do not allow for different heights and building levels.

Some existing solutions provide static directions for a user to return to his/her car from a fixed terminal. With the increased use of mobile user devices, users have come to rely on dynamic maps that provide directions from their current location.

SUMMARY

According to an aspect of the present invention, there is provided a computer-implemented method for providing navigational assistance to a target location in a vehicle parking facility, as provided at a server. A processor accesses stored vehicle registration numbers each mapped to a location of a vehicle in the parking facility in a database. A processor associates a user with a target vehicle registration number mapped to a location of a vehicle in the parking facility in the database. A processor receives input of a reference vehicle registration number from a mobile user device at a current location of the user using an input component of the mobile user device. A processor references the database of vehicle registration numbers including: identifying a current location in the facility by look up of the reference registration number, identifying a user's target location in the facility by look up of the target registration number associated with the user, and generating dynamic navigational instructions from the current location to the user's target location for sending to the mobile user device. A processor sends the dynamic navigational instructions from the remote server to the mobile user device for navigation from the current location to the user's target location.

According to another aspect of the present invention, there is provided a computer-implemented method for providing navigational assistance to a target location in a vehicle parking facility, as provided at a mobile user device. A processor receives input of a reference vehicle registration number at a current location of the user using an input component of the mobile user device. A processor connects to a remote server associated with a database of vehicle registration numbers mapped to locations in the parking facility. A processor identifies a user at the remote server and sending the reference vehicle registration number, wherein the remote server: identifies a current location in the facility by look up of the reference registration number; identifies a user's target location in the facility by look up of a target registration number associated with the user; and generates dynamic navigational instructions from the current location to the user's target location for sending to the mobile user device. A processor receives the dynamic navigational instructions from the remote server for navigation from the current location to the user's target location.

According to another aspect of the present invention, there is provided a system for providing navigational assistance to a target location in a vehicle parking facility, comprising a server including a processor and a memory configured to provide computer program instructions to the processor to execute the function of components including: a referencing component for accessing stored vehicle registration numbers each mapped to a location of a vehicle in the parking facility in a database; a user associating component for associating a user with a target vehicle registration number; a current location input component for receiving input of a reference vehicle registration number from a mobile user device at a current location of the user using an input component of the mobile user device; wherein the referencing component includes a current location identifying component for identifying a current location in the facility by look up of the reference registration number, a target location identifying component for identifying a user's target location in the facility by look up of the target registration number associated with the user, and an instruction generating component for generating dynamic navigational instructions from the current location to the user's target location for sending to the mobile user device; and an instruction sending component for sending the dynamic navigational instructions from the remote server to the mobile user device for navigation from the current location to the user's target location.

According to another aspect of the present invention, there is provided a system for providing navigational assistance to a target location in a vehicle parking facility, comprising a mobile user device including a processor and a memory configured to provide computer program instructions to the processor to execute the function of components including: a current location input component for receiving input of a reference vehicle registration number at a current location of the user using an input component of the mobile user device; a server connecting component for connecting to a remote server associated with a database of vehicle registration numbers mapped to locations in the parking facility; a user identifying component for identifying the user at the remote server and a current location sending component for sending the reference vehicle registration number, wherein the remote server identifies a current location in the facility by look up of the reference registration number, identifies a user's target location in the facility by look up of a target registration number associated with the user, and generates dynamic navigational instructions from the current location to the user's target location for sending to the mobile user device; and a navigation receiving component for receiving the dynamic navigational instructions from the remote server for navigation from the current location to the user's target location.

According to another aspect of the present invention, there is provided a computer program product for providing navigational assistance to a target location in a vehicle parking facility, the computer program product comprising a computer readable storage medium having program instructions embodied therewith, the program instructions executable by a processor to cause the processor to: access stored vehicle registration numbers each mapped to a location of a vehicle in the parking facility in a database; associate a user with a target vehicle registration number and storing the target vehicle registration number mapped to a location of a vehicle in the parking facility in the database; receive input of a reference vehicle registration number from a mobile user device at a current location of the user using an input component of the mobile user device; reference the database of vehicle registration numbers mapped to locations in the parking facility including identifying a current location in the facility by look up of the reference registration number, identifying a user's target location in the facility by look up of the target registration number associated with the user, and generating dynamic navigational instructions from the current location to the user's target location for sending to the mobile user device; and send the dynamic navigational instructions from the remote server to the mobile user device for navigation from the current location to the user's target location.

BRIEF DESCRIPTION OF THE DRAWINGS

Preferred embodiments of the present invention will now be described, by way of example only, with reference to the following drawings which include.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are described for providing navigational assistance to a target location in a vehicle parking facility. A vehicle parking facility may take many different forms and may be a car park, for example, in the form of an open-air expanse of parking bays, a multi-story building, or multiple buildings. The vehicle parking facility may include an automatic number plate recognition (ANPR) system, which recognizes vehicle registration plates of vehicles as they enter and/or park in the vehicle parking facility. ANPR systems are known by various names including, for example, automatic vehicle identification (AVI), license-plate recognition (LPR), etc.

The terms vehicle registration plate or number plate are used to refer to plates carrying characters in the form of numbers and/or letters (in any type of character set or alphabet) that are used to identify a vehicle. Such plates are used throughout the world and adhere to different criteria in different countries to meet local licensing and registration requirements.

An ANPR system in a vehicle parking facility may include a series of static ANPR cameras that track when a vehicle enters the vehicle parking facility, where the vehicle parks, and when the vehicle exits the vehicle parking facility. Such systems may provide car park payment monitoring and the vehicle registration may be associated with a parking ticket for payment of a parking fee. The described method and system may build upon such ANPR systems provided in vehicle parking facilities.

Figure 1:
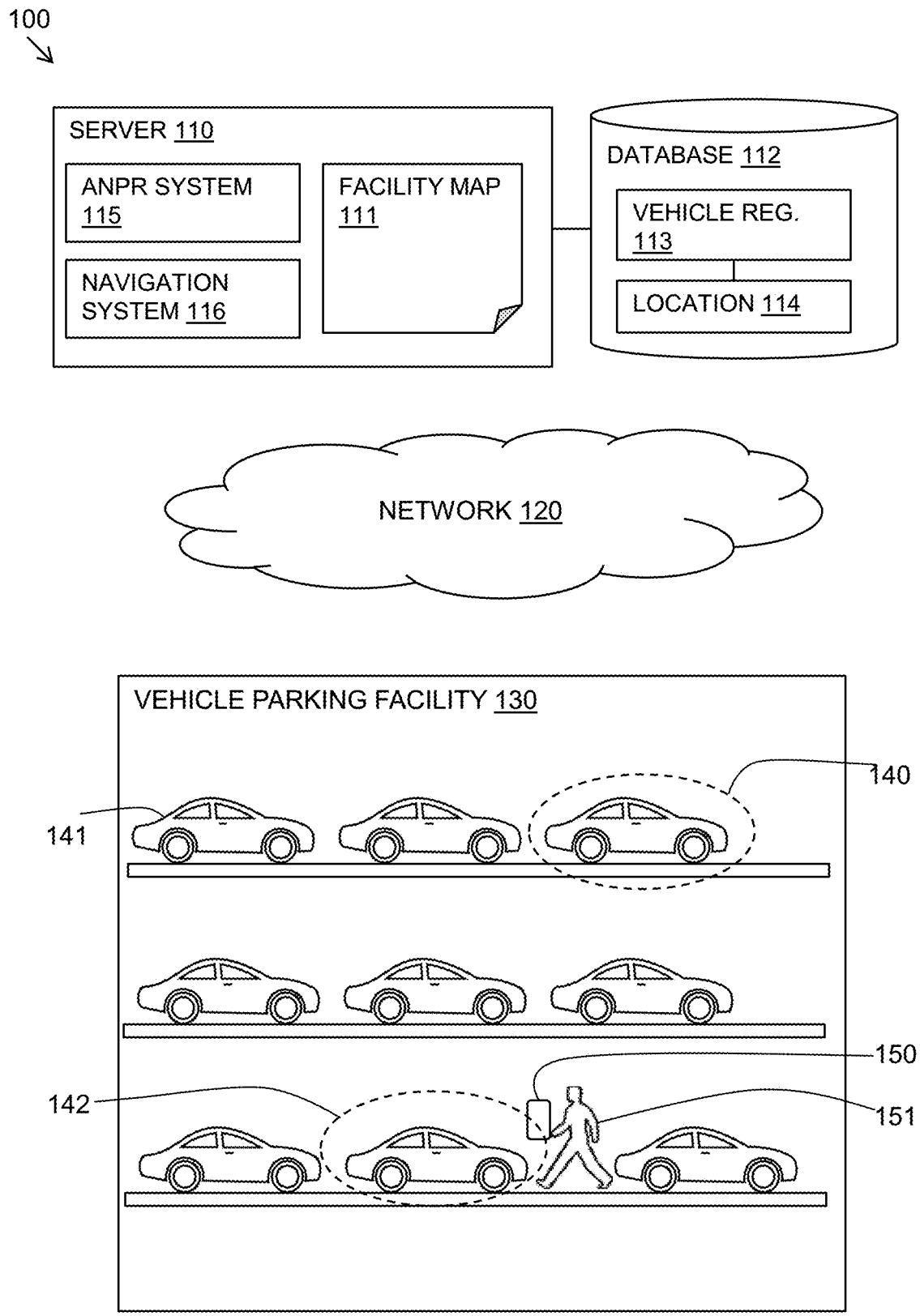
FIG. 1 is a schematic diagram of an example embodiment of a system in accordance with the present invention.

Referring to FIG. 1, a schematic diagram 100 illustrates an overview of the described system. In the depicted embodiment, vehicle parking facility 130 is shown with multiple parked vehicles 141. Parked vehicles 141 may be parked in designated bays and vehicle parking facility 130 may extend over multiple stories and buildings.

User 151 may be trying to locate target vehicle 140 in vehicle parking facility 130 and may use an application on mobile user device 150 to receive navigational instructions from server 110. User 151 may input a vehicle registration number of nearby vehicle 142 parked in vehicle parking facility 130 at the user's current location. Server 110 may use the inputted vehicle registration number to identify the user's current location and to provide navigational instructions to a target location of target vehicle 140. User 151 may be on foot, may be in another vehicle, or may be in a bus provided by vehicle parking facility 130.

Server 110 may be provided at vehicle parking facility 130 or may be provided remotely via network 120 and may include ANPR system 115 for monitoring vehicle registration numbers of parked vehicles 141 in vehicle parking facility 130. ANPR system 115 may maintain database 112 of current vehicle registration numbers 113 in vehicle parking facility 130 mapped to parking locations 114. Database 112 may also reference a user identifier such as a parking ticket number, a user name, or an identifier of user's mobile user device 150 in order to tie a request to a target vehicle.

Server 110 may include navigation system 116 providing navigational instructions to mobile user device 150 of user 151. Server 110 may include facility map 111 that includes details of vehicle parking bays or locations, and provides multiple instruction options between the parking locations that may be used to compile dynamic personalized navigational instructions for user 151.

Navigation system 116 may receive a request from user 151 via mobile user device 150 to provide navigational assistance to target vehicle 140. Target vehicle 140 may be the user's vehicle that the user is returning to, a hired vehicle that the user is locating for the first time, or any other vehicle for which the user knows the registration number or for which the registration number is recorded against the user.

Navigation system 116 may receive a vehicle registration number of nearby vehicle 142 parked in vehicle parking facility 140 at the user's current location and may look up in database 112 to find the target location of target vehicle 140 and relate this to nearby vehicle 142 at the user's current location. Facility map 111 may then be used by navigation system 116 to provide tailored navigational instructions to user 151 to navigate from the user's current location to the target location of target vehicle 140.

The navigational instructions may be updated as user 151 moves by using mobile user device 150 to capture other vehicle registrations numbers as user 151 moves through vehicle parking facility 130 enabling navigation system 116 to update the navigational instructions dynamically. Navigation system 116 may detect moving vehicles and prevent their vehicle registration plates from being used for the navigational information.

Figure 2:
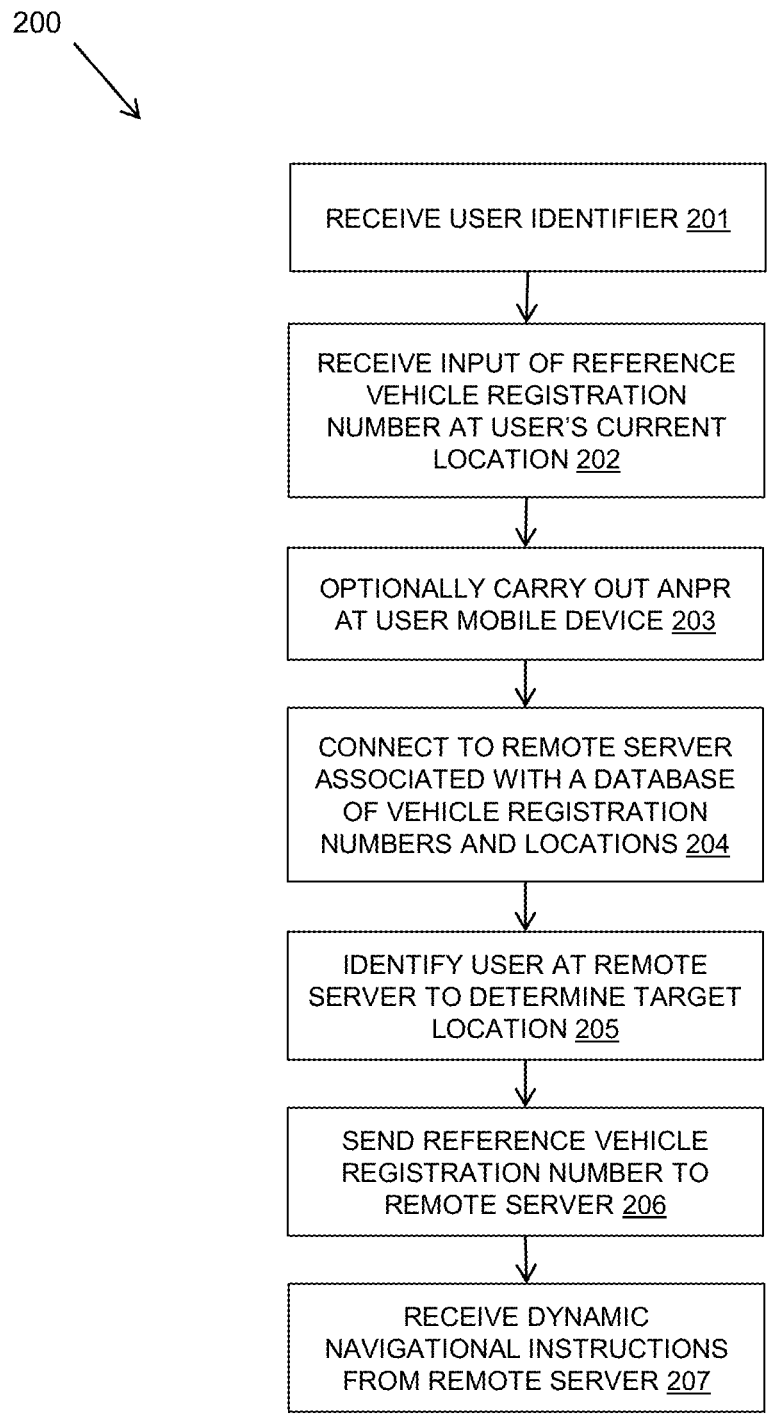
FIG. 2 is a flow diagram of an example embodiment of an aspect of a method at a mobile user device in accordance with the present invention.

Referring to FIG. 2, a flow diagram 200 shows an example embodiment of an aspect of the described method carried out at mobile user device 150. The functionality may be provided by a navigation application installed on mobile user device 150, such as a mobile phone. The navigation application may interact with remote server 110 providing corresponding functionality and navigational instructions.

In step 201, mobile user device 150 may receive a user identifier. The user identifier may identify the user of the navigation application for use when the application communicates with the remote server. In one embodiment, the user identifier may be a target vehicle registration number associated with a user of the mobile user device. For example, the user may manually enter his vehicle registration number into the mobile user device as the target vehicle.

In other embodiments, the application at the mobile user device may not need to know the target vehicle registration number and a reference may be sufficient to tie the user of the mobile user device to the target vehicle registration number at the server in order to identify the user's target vehicle and the target location. For example, a user name, a parking ticket number, a hire car reservation number, or a mobile user device identifier may be used to identify the user at the server and ascertain the target vehicle registration number. A user may register with the application via the mobile user device and a default vehicle may be registered against the user's user profile as the target vehicle registration number.

In some scenarios, a parking ticket may provide a reference number that ties the user to the target vehicle registration number by an ANPR system scanning the vehicle as it enters a facility and issuing the parking ticket. The parking ticket may be either a physical ticket that a user may scan into their mobile user device or an electronic ticket received wirelessly at the mobile user device.

In step 202, mobile user device 150 may receive an input of a reference vehicle registration number. The user may input a reference vehicle registration number in order to reference the user's current location. In one embodiment, the reference vehicle registration number may be input by capturing the vehicle registration number of a vehicle in the user's close vicinity with a camera of the mobile user device. The navigation application on the mobile user device may interact internally with a camera function of the mobile user device to enable the use of the camera via the navigation application. In another embodiment, for example where the mobile user device does not include a camera function, the reference vehicle registration number may be received via manual input by the user.

A camera may capture a still image or a video from which a still image may be extracted. For example, the user may activate a video whilst moving through the vehicle parking facility so that the navigational instruction may be updated by capturing updated reference vehicle registration numbers. The method may detect moving vehicles and prevent their registration numbers from being used as reference vehicles.

Optionally, in step 203, mobile user device 150 may carry out an ANPR. A captured image may be processed to extract a vehicle registration number using known methods. Alternatively, ANPR processing may be carried out at the remote server. Known ANPR processes use optical character recognition on images to read a registration number or other set of characters.

In step 204, mobile user device 150 may connect via a network such as a mobile communications network or Wi-Fi network to the remote server that is associated with a database of vehicle registration numbers and locations. The term registration number should be interpreted to include combinations of characters and not limited to numerals.

In step 205, the user is identified at the remote server to determine a target location by looking up the target registration number associated with the user. In step 206, mobile user device 150 may send the reference vehicle registration number to the remote server to look up a location of the reference vehicle and thereby determine a current location of the user. Alternatively, mobile user device 150 may send the reference vehicle registration number as a string or series of characters as locally extracted from an image of the reference vehicle or as entered manually by the user. Alternatively, mobile user device 150 may send the reference vehicle registration number as an image for extraction of the registration number at the remote server.

In step 207, mobile user device 150 may receive dynamic navigational instructions from the remote server from the current location at the reference vehicle to the target vehicle. The dynamic navigational instructions may be specifically designed to aid a user in their current mode of movement or transport. A pedestrian user may be given instructions to use stairs, elevators, small passageways, whereas a user with disability requirements will not be directed to stairs but instead to elevators or escalators. A user in a bus may be instructed to a bus stop number and a user in a car may be instructed to follow drivable routes.

Furthermore, an orientation of the mobile user device may be identified as the user captures the reference vehicle registration plate. The orientation may be identified by using internal functions of the mobile user device such as a compass, GPS component, accelerometer, or another sensor. The orientation may be communicated to the remote server and may be used to orientate the navigational instructions to instruct the user from the direction in which they are already pointing or heading.

Figure 3:
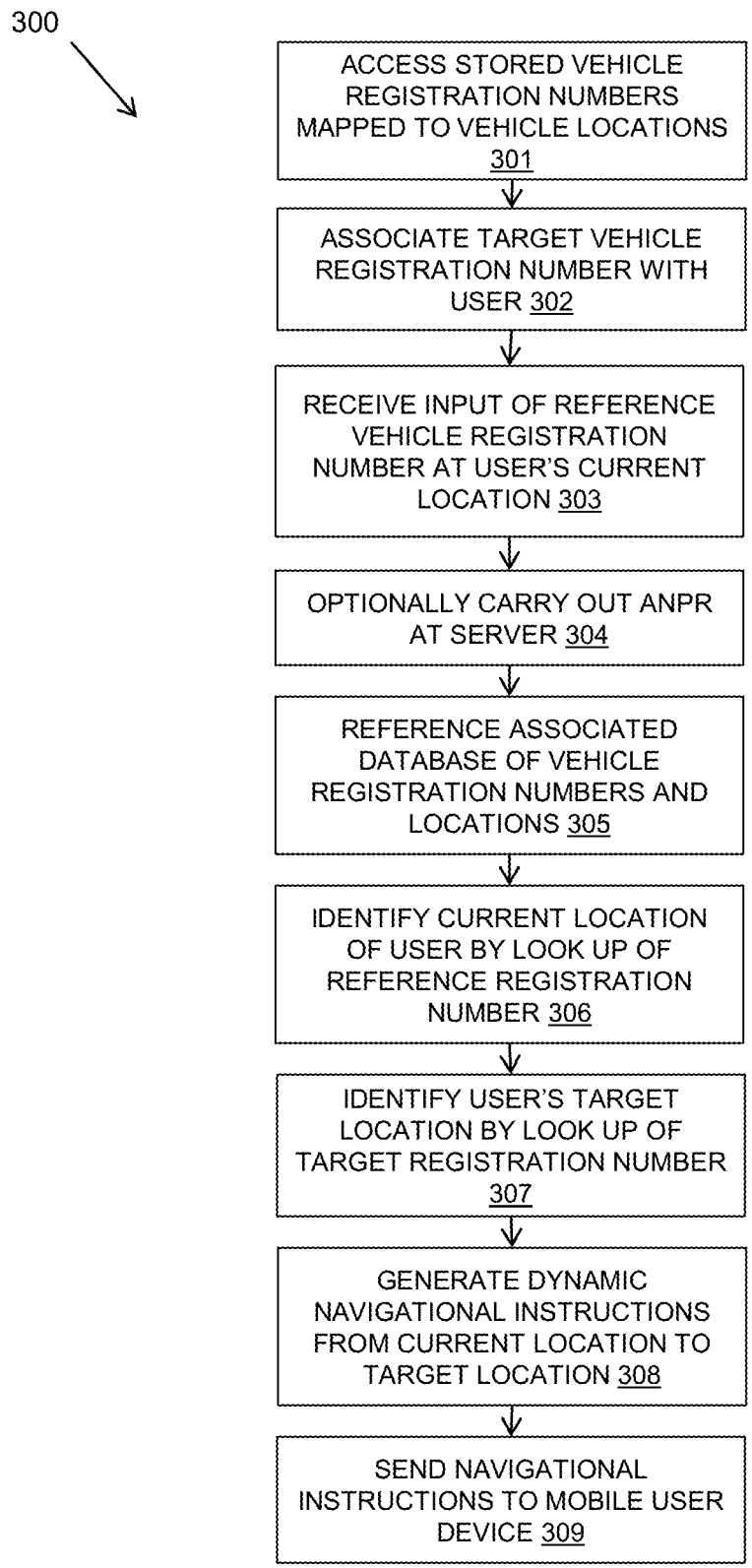
FIG. 3 is a flow diagram of an example embodiment of an aspect of a method at a server in accordance with the present invention.

Referring to FIG. 3, a flow diagram 300 shows an example embodiment of an aspect of the described method carried out at remote server 110. Server 110 may provide a navigation application to be installed on mobile user device 150, such as a mobile phone, that interacts with a service application at remote server 110.

In step 301, at server 110, the method may access stored vehicle registration numbers mapped to vehicle locations in a vehicle parking facility. The stored vehicle registration numbers may be stored in a database by an ANPR system that may be at server 110 or accessed by server 110. The ANPR system may be an existing system for monitoring vehicle locations in a facility.

In step 302, the method may associate a target vehicle registration number with a user. This may be by receiving the target vehicle registration number from a mobile user device or by linking a received reference to a target vehicle registration number. The received reference may be a user name, a parking ticket number, a vehicle hire reservation number, or an identifier of the connecting mobile user device.

In step 303, the method may receive input of a reference vehicle registration number as provided from the mobile user device at a user's current location. The reference vehicle registration number may be received as a string or series of characters as entered in the mobile user device or may be extracted by an ANPR processing at the mobile user device. In an alternative embodiment, the reference vehicle registration number may be received as an image captured by the mobile user device and received at the remote server in an unprocessed form. The captured image may be a still image or a video stream from which a series of reference vehicle registration numbers may be extracted. In step 304, in an alternative embodiment, the method may carry out the ANPR at server 110.

In step 305, the method may reference the associated database of vehicle registration numbers and locations. In step 306, the method may identify the current location of the user of the mobile user device by look up of the reference registration number. In step 307, the method may identify the user's target location by look up of the target registration number in the database.

In step 308, the method generates dynamic navigational instructions from the current location to the target location in the facility. Server 110 may reference a map of the facility and modular instructions for parts of routes may be recorded that may be combined to build instructions for individual required routes.

In step 309, the navigational instructions may be sent to the mobile user device. The navigational instructions may be provided for the mode of movement or transportation of the user and may categorize navigational instruction routes for different modes. The navigational instructions may also be provided according to a received orientation of the mobile user device indicating a current heading or direction.

Figure 4:
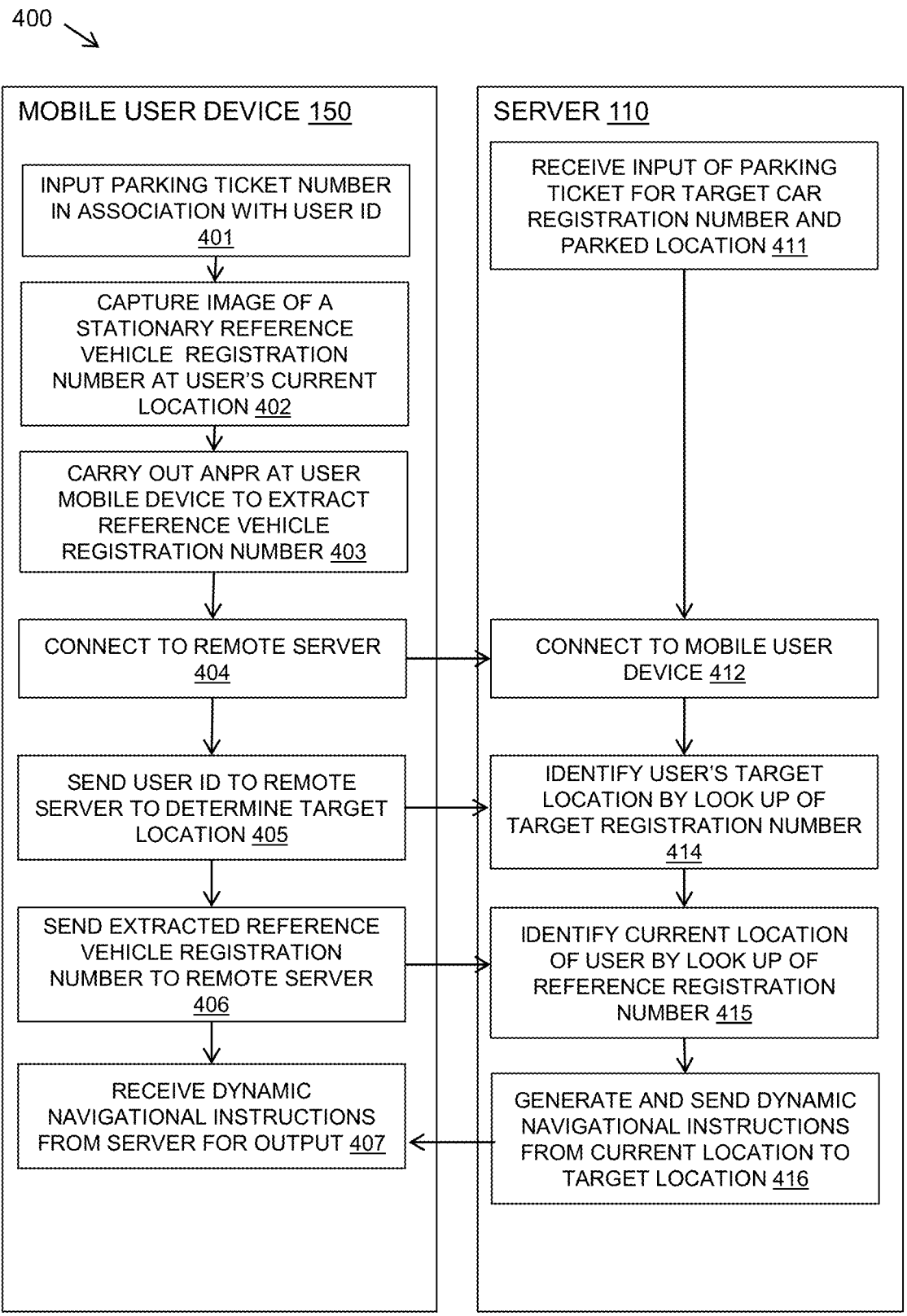
FIG. 4 is a swim-lane flow diagram of an example embodiment of a method in accordance with the present invention.

Referring to FIG. 4, a two swim-lane flow diagram 400 illustrates a specific embodiment of the described method with the method carried out at mobile user device 150 with interaction with server 110. The functionality may be provided by a navigation application installed on mobile user device 150, such as a mobile phone. The navigation application may interact with remote server 110 providing corresponding functionality and navigational instructions.

In step 401, the navigational application on mobile user device 150 inputs a parking ticket number associated with a user identifier. The user may be issued a parking ticket on entry into a vehicle parking facility as the vehicle number plate is scanned by a parking facility ANPR system. The user may scan his/her parking ticket into a navigation application on his/her mobile user device 150 providing a client navigational system. The scan may be carried out by an input means of mobile user device 150 such as a camera and may associate the parking ticket number with a user identifier at the application.

In step 411, server 110 may receive input of the parking ticket with the target vehicle registration number as scanned by the parking facility ANPR system and this may be mapped to a parked location in the facility as monitored by the ANPR system. This data may be stored in a database that is accessible by a navigational system provided at the server 110 in association with the ANPR system.

In step 402, mobile user device 150 enables a user to capture an image of a nearby vehicle's vehicle registration number at the user's current location in the parking facility using a camera of mobile user device 150. When the user wishes to return to the user's vehicle, the user may not recall exactly where the user parked. The image capture may be repeated at intervals either automatically or by further input by the user.

In step 403, the navigation application at mobile user device 150 may carry out an ANPR process to extract the characters of the registration number of a captured image. In an alternative embodiment, an unprocessed image may be sent to server 110 where the ANPR process may extract the characters of the registration number of the captured image.

In step 404, the navigation application may connect to server 110 that has the navigational system and which is associated with a database of stored vehicle registration numbers and locations and server 110 may establish the connection (step 412). For example, the connection may be via a mobile network or a Wi-Fi network.

In step 405, the navigation application at mobile user device 150 may send the user identifier or the parking ticket reference to server 110, which may be used at server 110 to identify the user's target location by looking up the target registration number of their vehicle that was scanned on entry and for which the parking location was recorded (step 414).

In step 406, the navigation application at mobile user device 150 may also send the extracted reference vehicle registration number at the user's current location to server 110, which may be used at server 110 to identify the user's current location by looking up the reference registration number in the database (step 415). The reference registration number may belong to any other customer using the parking facility.

In step 416, server 110 may use the current location and the target location and a map of the facility or existing navigational steps to generate or retrieve navigational instructions from the current location to the target location. In one embodiment, the instructions may be generated in real-time from a map of the facility. In another embodiment, instructions between different locations in the parking facility may be pre-generated and stored for retrieval.

In step 407, the navigation application at mobile user device 150 may receive the dynamic navigational instructions from server 110 and may display these to the user as a map via a user interface or as audio instructions via an audio output to navigate the user back to his parked vehicle.

As the user moves towards his/her vehicle, the navigation application may continue to collect camera data of parked vehicles and, from this, update the guidance instruction to the user. The application may detect moving cars and prevent their number plates being used for routing information.

In another embodiment, a user may be trying to find a hired vehicle in a parking facility for which he/she has a reservation number. The reservation number may be used to look up the target location at the server whilst the user captures a vehicle registration number at his current location, as explained above.

Figure 5:
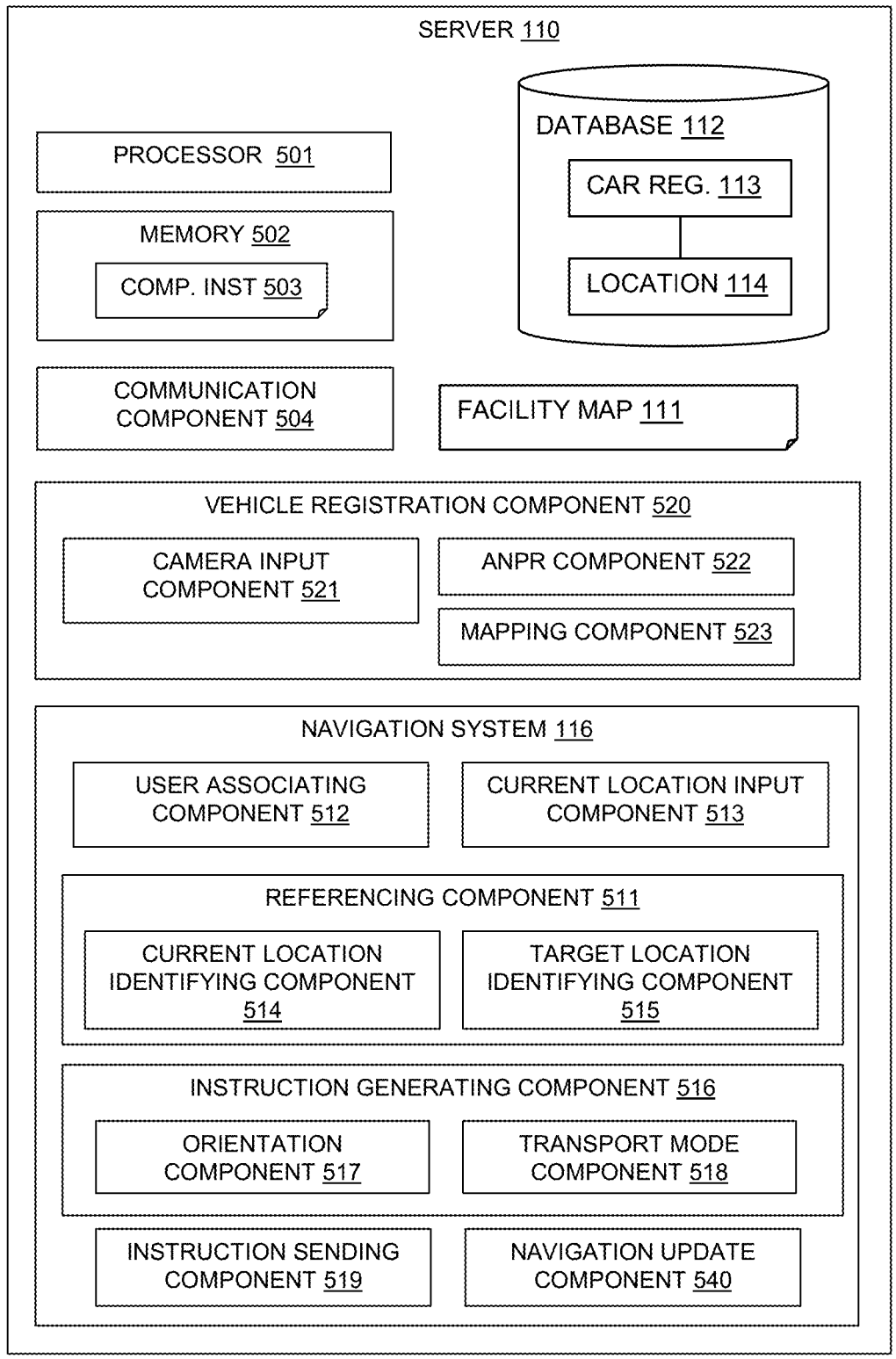
FIG. 5 is a block diagram of an example embodiment of a system at a server in accordance with the present invention.

Referring to FIG. 5, a block diagram illustration an example embodiment of the described system at remote server 110. Server 110 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

Server 110 may be located at a vehicle parking facility or may be at a remote location, for example, the server may be remote if server 110 services multiple facilities. Server 110 may include or be associated with vehicle registration component 520 in the form of ANPR system 115 for monitoring vehicle registration numbers of vehicles in a vehicle parking facility. Vehicle registration component 520 may maintain an updated database 112 of current vehicle registration numbers 113 in a vehicle parking facility mapped to their parking locations 114. Database 112 may also reference a user identifier such as a parking ticket number, a user name, or an identifier of user's mobile user device 150 in order to tie a request to a target vehicle.

Vehicle registration component 520 linked to ANPR system 115 may include camera input component 521 for receiving a camera input of a vehicle registration number of a vehicle in a parking facility; automatic number plate recognition component 522 for carrying out automatic number plate recognition to determine the vehicle registration number; and mapping component 523 for recording a parking location of facility map 111 of the vehicle by mapping to the vehicle registration number.

Server 110 may include communication component 504 for communicating with multiple mobile user devices 150 at locations remote from server 110. Server 110 may provide client navigation systems for mobile user devices 150 in the form of navigation applications downloadable onto mobile user devices 150 for use in communication with navigation system 116 at server 110.

Navigation system 116 may include referencing component 511 for referencing and accessing database 112 of stored vehicle registration numbers 113 mapped to locations 114. Navigation system 116 may include user associating component 512 for associating a user of a mobile user device with a target vehicle registration number stored in database 112.

Navigation system 116 may include current location input component 513 for receiving input of a reference vehicle registration number from mobile user device 150 at a current location of the user using an input component of mobile user device 150.

Referencing component 511 may include: (1) current location identifying component 514 or identifying a current location in the facility by look up of the reference registration number and (2) target location identifying component 515 for identifying a user's target location in the facility by look up of the target registration number associated with the user. Current location input component 514 may receive a captured image of the reference vehicle registration number and may use automatic number plate recognition component 522 for processing the image extract the reference vehicle registration number.

Navigation system 116 may include instruction generating component 516 for generating dynamic navigational instructions from the current location to the user's target location and instruction sending component 519 for sending the dynamic navigational instructions from remote server 110 to mobile user device 150 for navigation of a user from the user's current location to the user's target location. Instruction generating component 516 may include orientation component 517 for receiving a current compass orientation of the mobile user device and generating the dynamic navigational instructions from the current compass orientation and transport mode component 518 for tailoring navigational instructions to a mode of transport.

Navigation system 116 may include navigation update component 540 for repeating an instruction generation with a new reference vehicle registration number at a new current location in order to send updated dynamic navigational instructions to the user's target location.

Figure 6:
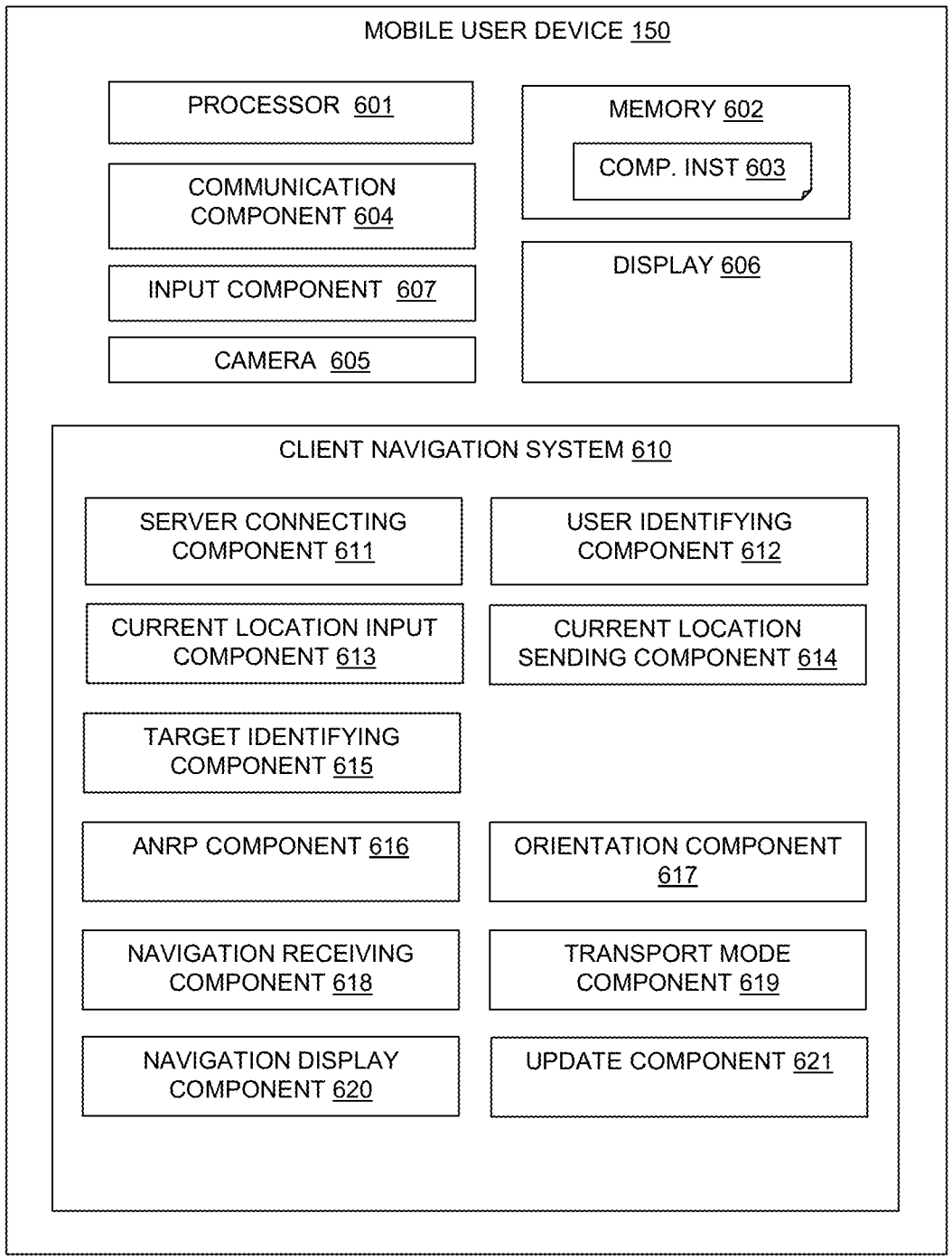
FIG. 6 is a block diagram of an example embodiment of a system at a mobile user device in accordance with the present invention.

Referring to FIG. 6, a block diagram illustration an example embodiment of the described system at mobile user device 150. Mobile user device 150 may include processor 601 or microprocessor, a hardware module, or a circuit for executing the functions of the described components which may be software units executing on processor 601. Memory 602 may be configured to provide computer instructions 603 to processor 601 to carry out the functionality of the components.

Mobile user device 150 may be a cellular mobile phone, a tablet with communication capabilities, a smart watch, or any mobile user device capable of receiving input from a user via input component 607 such as a touch screen or keypad, communicating with server 110 via communication component 604, and displaying or outputting instructions, for example, via display 606 or audio output.

Communication component 604 may include connection to various communication channels (e.g., a cellular telephone network, data transmission network, Wi-Fi network, satellite-phone network, Internet network, Satellite Internet Network, etc.).

Mobile user device 150 includes client navigation system 610 that may be in the form of a navigation application provided by navigation system 116 of server 110. Client navigation system 610 may include server connecting component 611 for connecting to server 110 that is associated with database 112 of vehicle registration numbers mapped to locations in vehicle parking facility 130.

Client navigation system 610 may include user identifying component 612 for identifying the user when communicating with the remote server and target identifying component 615 for identifying a target vehicle registration number associated with the user by entering the target vehicle registration number in input component 607 of mobile user device 150 or providing a reference tied to the target vehicle registration number. User identifying component 612 may provide the target vehicle registration number or a reference to it when connecting to server 110 and identifying the user at server 110.

Client navigation system 610 may include current location input component 613 for receiving input of a reference vehicle registration number at a current location of the user using input component 607 of mobile user device 150. In one embodiment, current location input component 613 may receive an image from camera 605 of mobile user device 150 for capturing an image of the reference vehicle registration number and automatic number plate recognition component 616 at mobile user device 150 or accessed by mobile user device 150 may use automatic number plate recognition processing to extract the reference vehicle registration number at mobile user device 150. Client navigation system 610 may include current location sending component 614 for sending a reference vehicle registration number to server 110.

Client navigation system 610 may include orientation component 617 for detecting a current compass orientation of mobile user device 150 and sending this to server 110 in order to receive the navigational instructions from the current compass orientation of the device. Client navigation system 610 may include transport mode component 619 for specifying to server 110 the mode of transport being used in order to receive appropriate navigational instructions.

Client navigation system 610 may include navigation receiving component 618 for receiving the dynamic navigational instructions from server 110 for navigation from the current location to the user's target location and navigation display component 620 for displaying the navigational instructions.

Client navigation system 610 may include update component 621 for updating server 110 with a new reference vehicle registration number at a new current location in order to receive updated dynamic navigational instructions to the user's target location.

Figure 7:
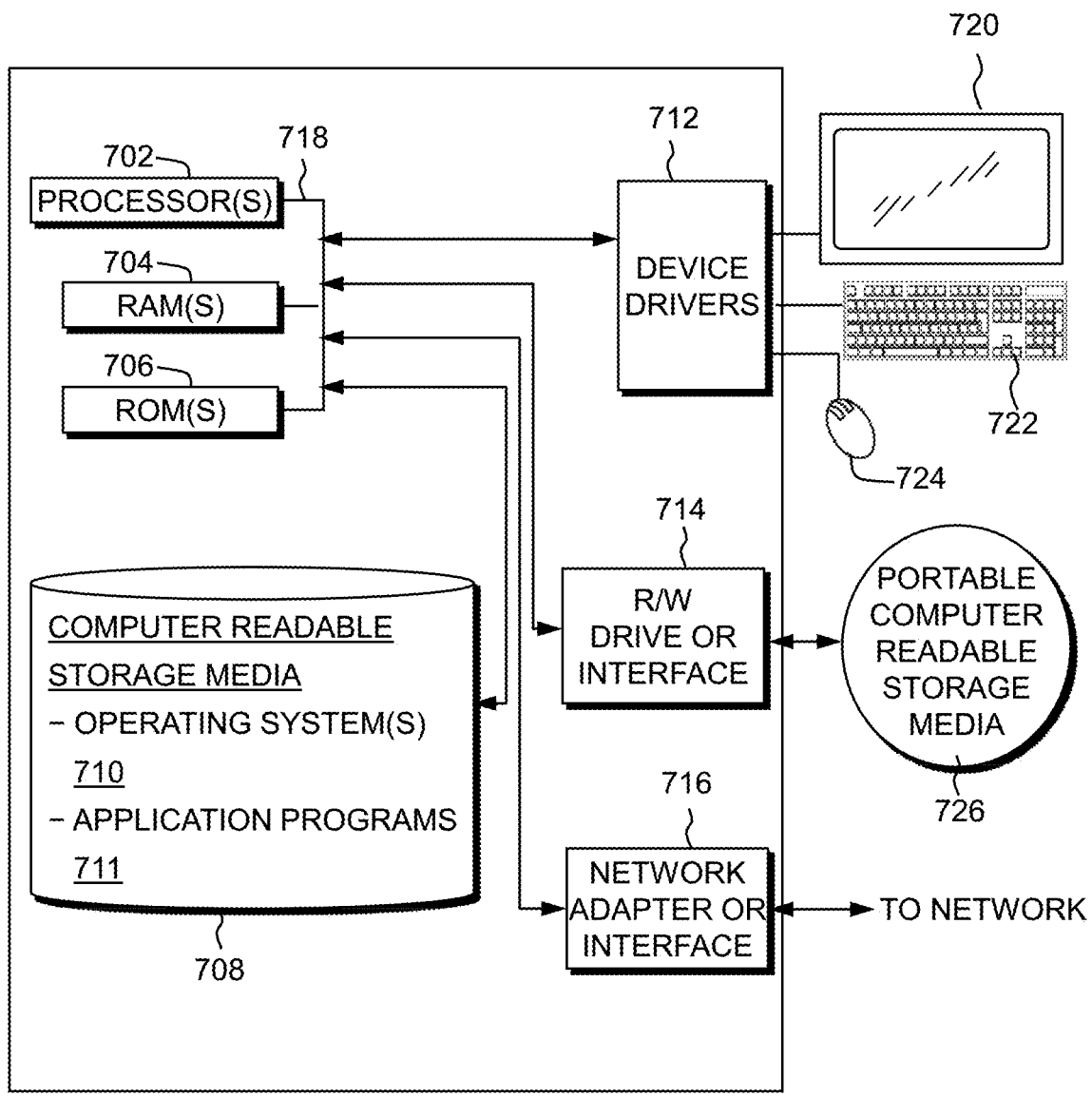
FIG. 7 is a block diagram of an embodiment of a computer system or cloud server in which an aspect of the present invention may be implemented.

FIG. 7 depicts a block diagram of components of a computing device for server 110 or mobile user device 150. It should be appreciated that FIG. 7 provides only an illustration of one implementation and does not imply any limitations with regard to the environments in which different embodiments may be implemented. Many modifications to the depicted environment may be made.

Computing device can include one or more processors 702, one or more computer-readable RAMs 704, one or more computer-readable ROMs 706, one or more computer readable storage media 708, device drivers 712, read/write drive or interface 714, and network adapter or interface 716, all interconnected over communications fabric 718. Communications fabric 718 can be implemented with any architecture designed for passing data and/or control information between processors (such as microprocessors, communications and network processors, etc.), system memory, peripheral devices, and any other hardware components within the system.

One or more operating systems 710, and application programs 711, are stored on one or more of the computer readable storage media 708 for execution by one or more of processors 702 via one or more of the respective RAMs 704 (which typically include cache memory). In the illustrated embodiment, each of computer readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device can also include an R/W drive or interface 714 to read from and write to one or more portable computer readable storage media 726. Application programs 711 on the computing device can be stored on one or more of portable computer readable storage media 726, read via the respective R/W drive or interface 714 and loaded into respective computer readable storage media 708.

Computing device can also include a network adapter or interface 716, such as a TCP/IP adapter card or wireless communication adapter. Application programs 711 on the computing device can be downloaded to the computing device from an external computer or external storage device via a network (for example, the Internet, a local area network or other wide area networks or wireless networks) and network adapter or interface 716. From the network adapter or interface 716, the programs may be loaded into computer readable storage media 708. The network may comprise copper wires, optical fibers, wireless transmission, routers, firewalls, switches, gateway computers and edge servers.

Computing device can also include display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. Device drivers 712, R/W drive or interface 714, and network adapter or interface 716 can comprise hardware and software stored in computer readable storage media 708 and/or ROM 706.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
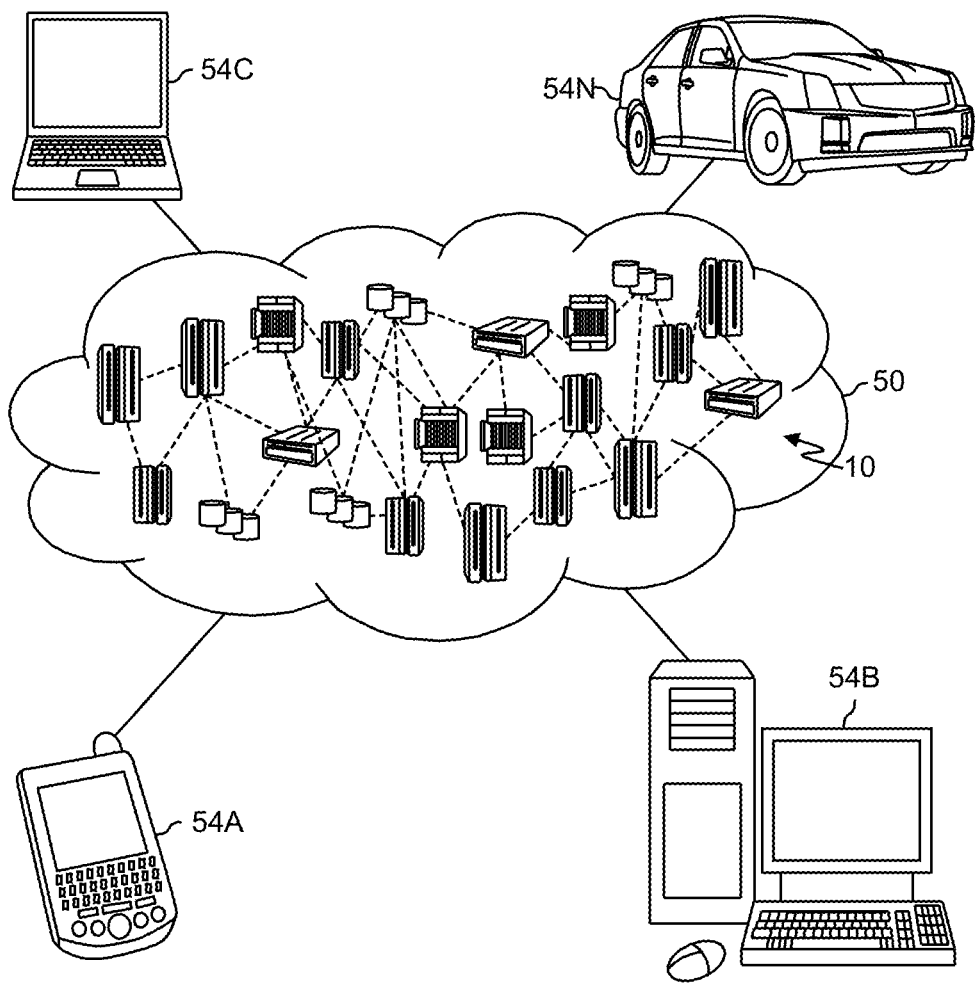
FIG. 8 is a schematic diagram of a cloud computing environment in which the present invention may be implemented.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
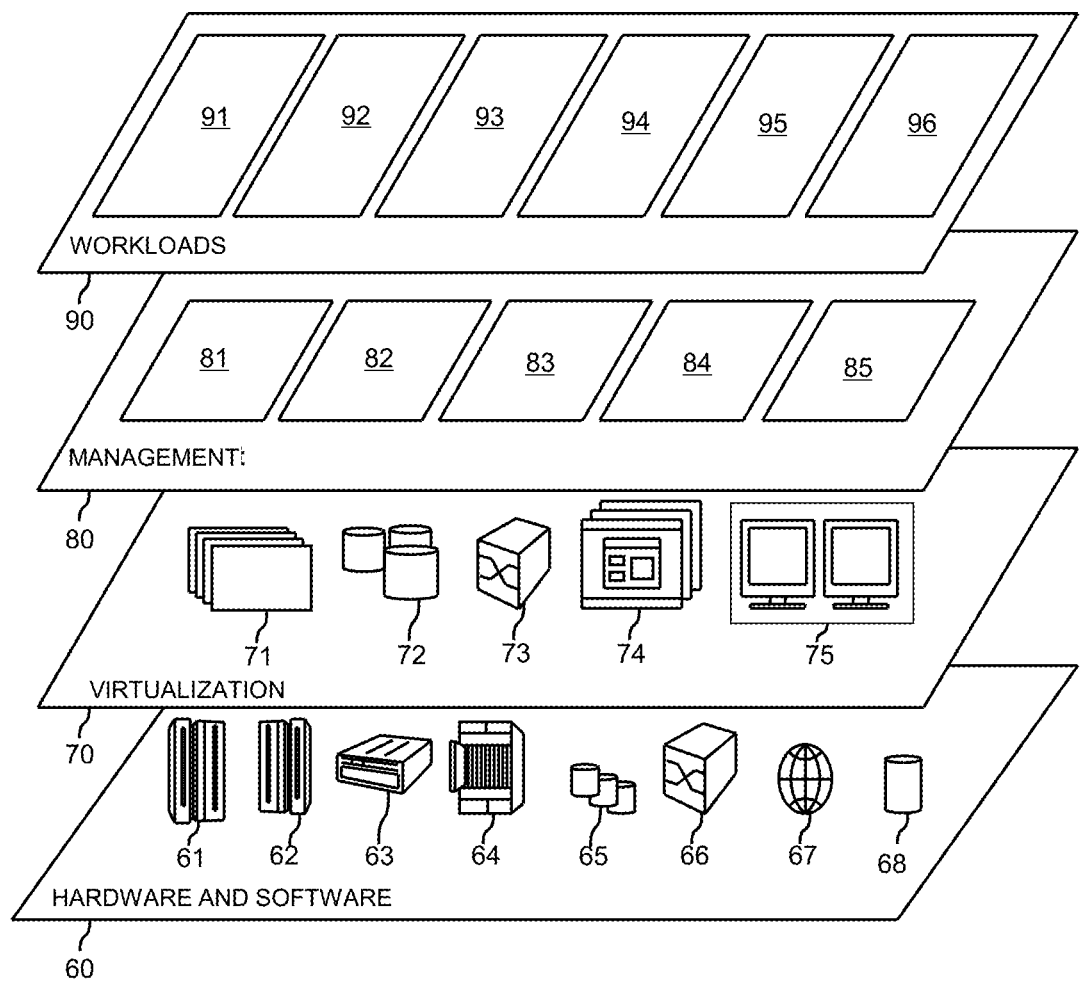
FIG. 9 is a diagram of abstraction model layers of a cloud computing environment in which the present invention may be implemented.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and navigational assistance processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for providing navigational assistance to a target location in a vehicle parking facility as provided at a server, comprising:
   accessing stored vehicle registration numbers each mapped to each location of each parked vehicle in the vehicle parking facility in a database;

associating a user with a target vehicle registration number mapped to the target location of a target vehicle in the vehicle parking facility in the database;

receiving input of a user identifier and a reference vehicle registration number from a mobile user device at a current location of the user using an input component of the mobile user device, wherein the user identifier is a hire car reservation number that is associated with the target vehicle registration number;

receiving a compass orientation of the mobile user device;

identifying the current location in the vehicle parking facility by look up of the reference vehicle registration number in the database;

identifying the target location of the user in the vehicle parking facility by look up of the target vehicle registration number associated with the user in the database; and generating dynamic navigational instructions based on the compass orientation and a current mode of transport of the user from the current location to the target location of the user for sending to the mobile user device, wherein the current mode of transport of the user is riding a bus;

sending the dynamic navigational instructions from the remote server to the mobile user device for navigation from the current location to the target location;

receiving a second reference vehicle registration number at a second current location, wherein the second current location is different from the current location; and sending, from the remote server to the mobile user device, updated dynamic navigational instructions to the target location generated based on the second current location.

2. The method as claimed in claim 1, wherein receiving input of the user identifier and the reference vehicle registration number further comprises:
receiving a captured image of the reference vehicle registration number of a nearby vehicle; and
using automatic number plate recognition (ANPR) processing to extract the reference vehicle registration number at the server.

3. The method as claimed in claim 1, further comprising:
storing the vehicle registration numbers each mapped to each location of each parked vehicle in the parking facility in a database, which further comprises:
receiving a camera input of a vehicle registration number plate of a vehicle in the vehicle parking facility;
carrying out automatic number plate recognition to determine the vehicle registration number; and
recording a parking location of the vehicle by mapping to the vehicle registration number.

4. A computer-implemented method for providing navigational assistance to a target location in a vehicle parking facility as provided at a mobile user device, comprising:
receiving input of a user identifier and a reference vehicle registration number at a current location of the mobile user device using an input component of the mobile user device, wherein the current location includes a compass orientation of the mobile user device, wherein the user identifier is a hire car reservation number that is associated with the target vehicle registration number;
connecting to a remote server associated with a database of vehicle registration numbers mapped to locations in the vehicle parking facility;
identifying the user at the remote server and sending the reference vehicle registration number, wherein the remote server:
identifies the current location in the vehicle parking facility by look up of the reference vehicle registration number;
identifies a target location of the user in the vehicle parking facility by look up of a target registration number associated with the user; and
generates dynamic navigational instructions based on the compass orientation and a current mode of transport of the user from the current location to the target location of the user for sending to the mobile user device, wherein the current mode of transport of the user is riding a bus;
receiving the dynamic navigational instructions from the remote server for navigation from the current location to the target location;
receiving a second reference vehicle registration number at a second current location, wherein the second current location is different from the current location; and
sending, from the remote server to the mobile user device, updated dynamic navigational instructions to the target location generated based on the second current location.

5. The method as claimed in claim 4, wherein receiving input of the user identifier and the reference vehicle registration number further comprises:
capturing an image of the reference vehicle registration number of a nearby vehicle.

6. The method as claimed in claim 5, further comprising:
using automatic number plate recognition processing to extract the reference vehicle registration number at the mobile user device.

7. The method as claimed in claim 4, further comprising:
identifying the target vehicle registration number associated with the user of the mobile user device by entering the target vehicle registration number in the mobile user device or based on the user identifier tied to the target vehicle registration number.

8. The method as claimed in claim 7, further comprising:
providing the target vehicle registration number or the user identifier associated with the mobile user device when connecting to the remote server.

9. A system for providing navigational assistance to a target location in a vehicle parking facility, comprising a server including:
a processor and a memory configured to provide computer program instructions to the processor to execute the function of components of the server including:
a referencing component for accessing stored vehicle registration numbers each mapped to each location of each parked vehicle in the vehicle parking facility in a database, wherein the referencing component comprises:
a current location identifying component for identifying a current location of a mobile user device in the vehicle parking facility by look up of a reference vehicle registration number,
a target location identifying component for identifying a target location of the mobile user device in the vehicle parking facility by look up of a user identifier associated with the mobile user device, wherein the user identifier is a hire car reservation number that is associated with a target vehicle registration number, and an instruction generating component for generating dynamic navigational instructions based on a compass orientation of the mobile user device and a current mode of transport of the user from the current location to the target location of the user for sending to the mobile user device, wherein the current mode of transport of the user is riding a bus;

a user associating component for associating the mobile user device with the user identifier and target vehicle registration number;

a current location input component for receiving input of the reference vehicle registration number from the mobile user device at the current location of the mobile user device using an input component of the mobile user device;

an orientation component for receiving the compass orientation of the mobile user device using an internal compass component of the mobile user device;

an instruction sending component for sending the dynamic navigational instructions from the remote server to the mobile user device for navigation from the current location to the target location; and a navigation update component for receiving a second reference vehicle registration number at a second current location and for sending, from the remote server to the mobile user device, updated dynamic navigational instructions to the target location generated based on the second current location.

10. The system as claimed in claim 9, wherein the current location input component receives a captured image of the reference vehicle registration number and uses an automatic number plate recognition component for extracting the reference vehicle registration number.

11. The system as claimed in claim 9, further comprising a vehicle registration component for registering vehicles in the database, wherein the vehicle registration component comprises:
  a camera input component for receiving a camera input of a vehicle registration number of a vehicle in a parking facility;
  an automatic number plate recognition component for carrying out automatic number plate recognition to determine the vehicle registration number; and
  a mapping component for recording a parking location of the vehicle by mapping to the vehicle registration number.

12. A system for providing navigational assistance to a target location in a vehicle parking facility, comprising a mobile user device including:
  a processor and a memory configured to provide computer program instructions to the processor to execute the function of components of the mobile user device including:
  a current location input component for receiving input of a reference vehicle registration number at a current location of a user using an input component of the mobile user device;
  an orientation component for receiving the compass orientation of the mobile user device using an internal compass component of the mobile user device;
  a server connecting component for connecting to a remote server associated with a database of vehicle registration numbers mapped to locations in the vehicle parking facility;
  a user identifying component for identifying the user at the remote server based on input of a user identifier, wherein the user identifier is a hire car reservation number that is associated with the target vehicle registration number;
  a current location sending component for sending the reference vehicle registration number;
  wherein the remote server:
    identifies a current location in the vehicle parking facility by look up of the reference registration number,
    identifies a target location of the user in the vehicle parking facility by look up of the user identifier associated with the user, and
    generates dynamic navigational instructions based on the compass orientation and a current mode of transport of the user from the current location to the target location of the user for sending to the mobile user device, wherein the current mode of transport of the user is riding a bus;
  a navigation receiving component for receiving the dynamic navigational instructions from the remote server for navigation from the current location to the target location; and
  a navigation update component for receiving a second reference vehicle registration number at a second current location and for sending, from the remote server to the mobile user device, updated dynamic navigational instructions to the target location generated based on the second current location.

13. The system as claimed in claim 12, wherein the current location input component receives an image from a camera of the mobile user device of the reference vehicle registration number.

14. A computer program product for providing navigational assistance to a target location in a vehicle parking facility, the computer program product comprising a computer readable hardware storage medium having program instructions embodied therewith, the program instructions executable by a processor to cause the processor to:
  access stored vehicle registration numbers mapped to locations of parked vehicles in the vehicle parking facility in a database;
  associate a user with a target vehicle registration number mapped to a target location of a target vehicle in the vehicle parking facility in the database and store the target vehicle registration number;
  receive input of a user identifier and a reference vehicle registration number from a mobile user device at a current location of the user using an input component of the mobile user device, wherein the user identifier is a hire car reservation number that is associated with the target vehicle registration number;
  receive a compass orientation of the mobile user device using an internal compass component of the mobile user device;
  reference the database of vehicle registration numbers mapped to locations in the vehicle parking facility including:
    identifying the current location in the vehicle parking facility by look up of the reference registration number;
    identifying the target location in the vehicle parking facility by look up of the target registration number associated with the user; and
    generating dynamic navigational instructions based on the compass orientation and a current mode of transport of the user from the current location to the target location of the user for sending to the mobile user device, wherein the current mode of transport of the user is riding a bus;

send the dynamic navigational instructions from the remote server to the mobile user device for navigation from the current location to the target location;

receive input of a second reference vehicle registration number at a second current location, wherein the second current location is different from the current location; and send, from the remote server to the mobile user device, updated dynamic navigational instructions to the target location generated based on the second current location.

* * * * *